United States Patent [19]

Minami et al.

[11] Patent Number: 4,502,123
[45] Date of Patent: Feb. 26, 1985

[54] NAVIGATION SYSTEM FOR USE WITH AN AUTOMOBILE AND READING UNIT FOR THE SYSTEM

[75] Inventors: Kazuaki Minami, Kariya; Shinzo Totani, Nagoya; Kunio Miura, Okazaki; Kazushi Akutsu; Shinji Ohyama, both of Kariya, all of Japan

[73] Assignee: Nippondenso Co., Ltd., Kariya, Japan

[21] Appl. No.: 395,338

[22] Filed: Jul. 6, 1982

[30] Foreign Application Priority Data

Jul. 7, 1981 [JP] Japan .................. 56-106570

[51] Int. Cl.³ ............................. G06F 15/50
[52] U.S. Cl. ..................... 364/424; 364/449; 364/521; 340/990; 340/995; 73/178 R; 343/451
[58] Field of Search ............ 364/424, 443, 444, 449, 364/521; 353/11, 12; 343/450–453; 340/988–990, 992, 995, 996; 73/178 R; 358/104; 360/61, 79, 94, 132, 134

[56] References Cited

U.S. PATENT DOCUMENTS

| | | | |
|---|---|---|---|
| 3,760,360 | 9/1973 | Reynolds et al. | 340/990 |
| 4,086,632 | 4/1978 | Lions | 340/709 |
| 4,109,115 | 8/1978 | Yamamoto | 360/61 |
| 4,139,889 | 2/1979 | Ingels | 364/424 |
| 4,159,490 | 6/1979 | Wood | 340/996 |
| 4,253,150 | 2/1981 | Scovill | 343/451 |
| 4,280,136 | 7/1981 | Kashima et al. | 360/132 |
| 4,291,373 | 9/1981 | Mizote et al. | 340/996 |
| 4,312,577 | 1/1982 | Fitzgerald | 353/12 |
| 4,398,300 | 8/1983 | D'Alayer de Costemore D'Arc et al. | 360/94 |

FOREIGN PATENT DOCUMENTS 55-159299  12/1980  Japan .

*Primary Examiner*—Gary Chin
*Attorney, Agent, or Firm*—Cushman, Darby & Cushman

[57] ABSTRACT

In a navigation system arranged to display a road map in accordance with road map information from a cassette tape, and the present location of a motor vehicle equipped with the navigation system, a cassette tape distinguishing circuit is provided to a cassette tape player which picks up the road map information from a predetermined cassette having a window at given portion of the cassette housing. A switching circuit is responsive to the cassette tape distinguishing circuit so that the output data of the cassette tape is processed to display a given map only when a cassette carrying road map information is loaded in the cassette tape player. In the case a normal cassette carrying audio signals, such as music, is loaded the picked up audio signal is transmitted to an amplifier so that sound reproduction is effected. Thus, a single cassette player can be used in common as both a part of the navigation system and a part of a sound reproduction system.

9 Claims, 13 Drawing Figures

FIG. 3A
FIG. 3C
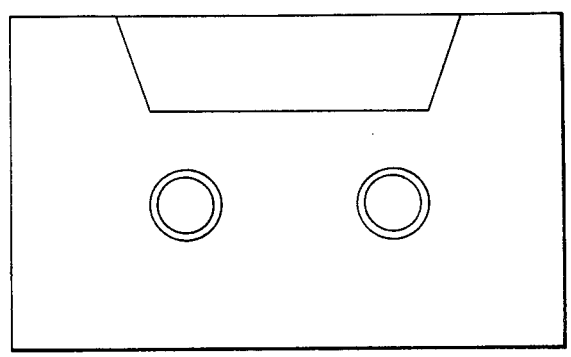
FIG. 3B
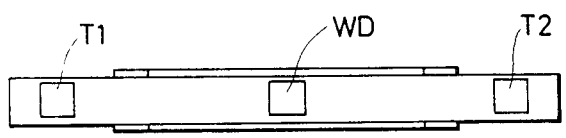

NAVIGATION SYSTEM FOR USE WITH AN AUTOMOBILE AND READING UNIT FOR THE SYSTEM

BACKGROUND OF THE INVENTION

This invention relates generally to a navigation system for use with an automobile, which system indicates the present location of the automobile on a displayed road map.

A prior art navigation system for use with an automobile is disclosed in Japanese Patent Provisional Publication (Kokai) No. 55-159299. This prior art system, comprises a distance sensor which measures the travelled distance of a motor vehile, and a direction sensor which detects the travelling diretion of the motor vehicle so that the present location of the motor vehicle is indicated on a road map associated with a display. This system, however, suffers from a drawback that it is troublesome to handle the same because various maps printed on transparent films have to be changed by taking one out of the display unit and inserting another one thereinto.

In order to remove the above-mentioned disadvantage, the inventors of the present invention have divised a system using a tape player which reads road map information from a cassette tape. Namely, a plurality of pieces of information each indicating a road map of a predetermined region or section are prerecorded in a cassette tape so that a desired piece of information can be selectively read out to image a corresponding road map on a display.

Stereophonic audio sound reproduction systems having a cassette tape player are widely used in motor vehicles nowadays. Therefore, if the cassette tape player or recorder used for such stereophonic sound reproduction system in motor vehicles can be used as the cassette tape player for deriving road map information, the navigation system will be manufactured with less cost, while it would be convenient to the users because manipulation of cassette tape players is very simple.

However, conventional cassette tape players, which are widely used for reproducing audio signals, cannot simply be adapted because it is necessary to detect whether the information derived from a cassette tape is either an audio signal, such as music, or data indicative of road map information. It is necessary to provide an arrangement for switching the output signal from the cassette player in accordance with the contents of a cassette tape loaded into the cassette player.

SUMMARY OF THE INVENTION

It is, therefore, an object of the present invention to provide a new and useful navigation system for use with an automobile, with which system a single cassette player can be used in common for reproducing both audio signals for the sound reproduction system mounted on a motor vehicle and data of road maps.

According to a preferred embodiment of the present invention a cassette-sort detector is provided in a cassette tape player for detecting whether a cassette tape loaded into the player is either a normal audio cassette tape or a cassette tape carrying road map data. The output signal from the tape player will be switched by a detection signal from the cassette-sort detector. Therefore, when a cassette tape carrying road map data is loaded, the navigation system according to the present invention is energized to display a desired map on a display unit, while the present location of the motor vehicle is also indicated in the displayed map. In a preferred embodiment of the present invention, in order to distinguish between the two different types of cassette tapes, a small window is made at a predetermined portion of a cassette of the type which carries road map data. When the presence of the window is detected by the cassette-sort detector, the cassette tape is regarded as carrying road map data. On the other hand, in the absence of such a window normal sound reproduction is effected in the conventional manner.

BRIEF DESCRIPTION OF THE DRAWINGS

The object and features of the present invention will become more readily apparent from the following detailed description of the preferred embodiment taken in conjunction with the accompanying drawings in which:

FIGS. 3A, 3B and 3C are respectively a top plan view, a front view and a side view of a cassette tape carrying road map data;

The same or corresponding elements and parts are designated at like reference numerals throughout the drawings.

DETAILED DESCRIPTION OF THE INVENTION

Figure 1:
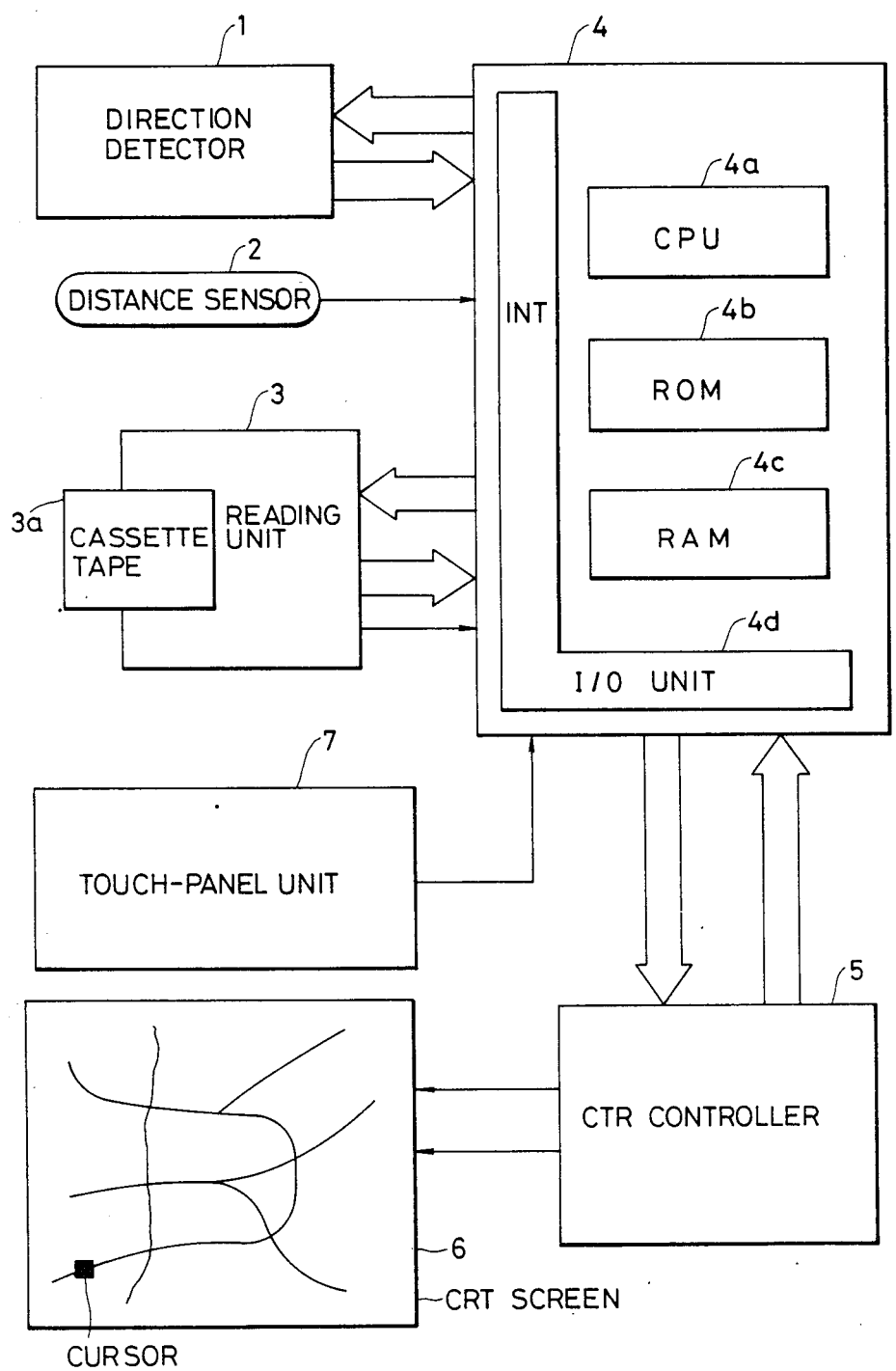
FIG. 1 is a schematic block diagram showing an embodiment of the navigation system according to the present invention.

Referring now to FIG. 1 a schematic diagram of an embodiment of the navigation system according to the present invenion is shown. The system comprises generally a direction detector 1, a distance sensor 2, a reading unit 3, a microcomputer 4, a CRT controller 5, a CRT unit 6 and a touch-panel unit 7.

The direction detector 1 comprises a direction sensor which detects X and Y co-ordinate components of the earth magnetism in accordance with the travelling direction of a motor vehicle on which the navigation system is mounted, and an A/D converter which converts the output signal from the direction sensor into a digital signal. Therefore, the direction detector 1 generates a digital signal indicative of X and Y components in accordance with the travelling direction of the motor vehicle.

The distance sensor 2 generates a pulse each time the motor vehicle travels a unit distance, such as 39.2 centimeters. The reading unit 3 comprises a cassette tape player which reads prerecorded data or information from a loaded cassette tape 3a. Road map data of a plurality of geographical regions or sections are prerecorded or prewritten in the cassette tape 3a in a predetermined sequence. Data of the absolute co-ordinates of a predetermined point, such as a point at the right top, of each map is also prerecorded in the cassette tape 3a so that desired data corresponding to a desired map can be selectively derived.

The microcomputer 4 which is arranged to execute digital operations in accordance with a predetermined control program, comprises a CPU 4a, a ROM 4b, a RAM 4c, an I/O unit 4d in the same manner as well-known microcomputer arrangement. The mircocomputer 4 is supplied with electrical power of 5 volts from an unshown power regulating circuit which receives electrical power from a vehicle-mounted battery (not shown). The microcomputer 4 generates a display output signal with which a map of a specific region and information of trvelling route are displayed, by processing various data from the direction detector 1, the distance sensor 2 and the reading unit 3. The RAM 4c of the microcomputer 4 is always supplied with electrical power from the vehicle-mounted battery so that data stored therein is not erased.

The CRT controller 5 receives the display output signal from the microcomputer 4 to store a map data of a specific region, travelling route information and character data respectively, and also generates a video signal and a synchronous signal for displaying the stored map data, travelling information and the character data on the CRT unit 6. The CRT unit 6 displays the above-mentioned information in receipt of data from the CRT controller 5.

The touch-panel unit 7 is attached to the outer surface of the screen of the CRT unit 6, and is divided into twelve (12) touch-areas. The touch panel unit 7 comprises twelve switches associated with the touch-areas to produce a serial signal when a predetermined touch-area among the twelve touch-areas is touched by a finger of the user.

Figure 2:
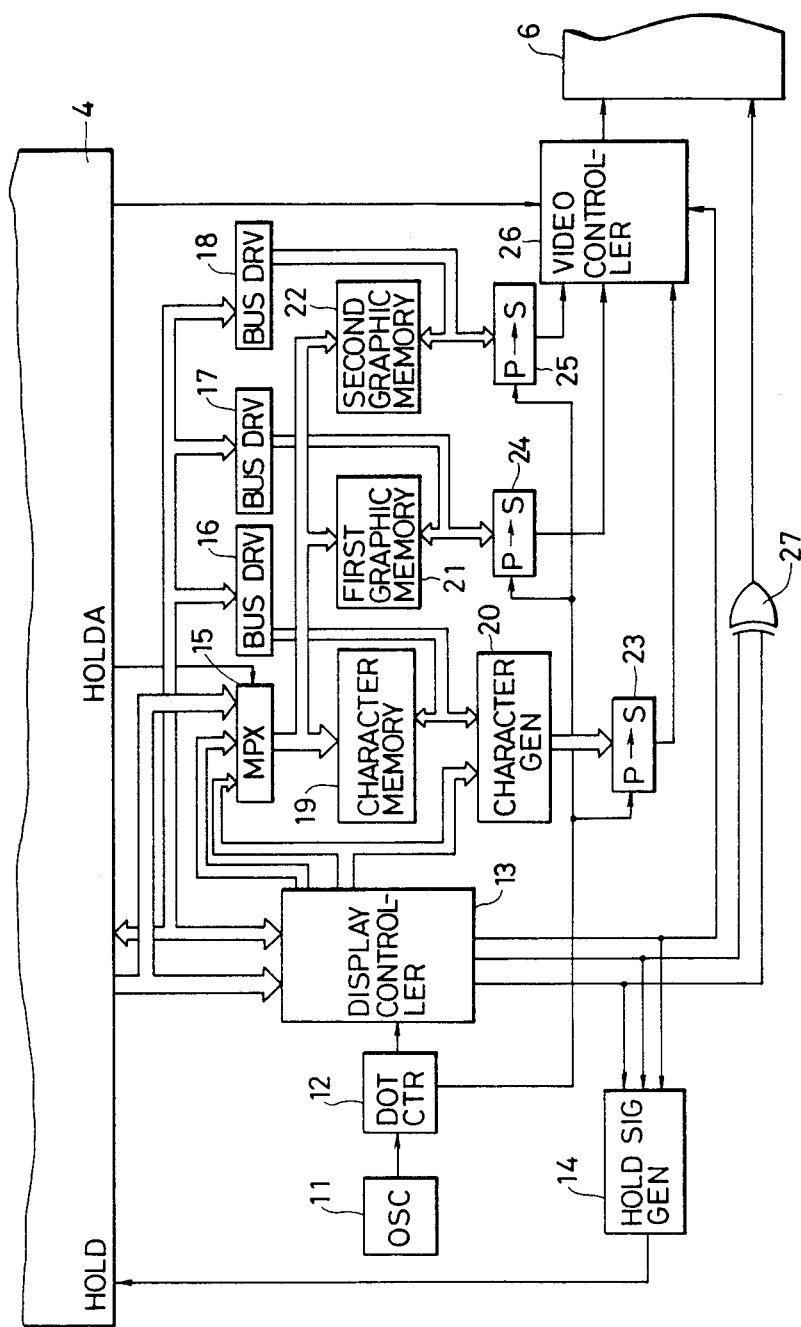
FIG. 2 is an electrical wiring diagram of the CRT controller shown in FIG. 1.

FIG. 2 illustrates an electrical wiring diagram of the CRT controller 5. An oscillator 11 generates an oscillation signal of 12.096 MHz, and this oscillation signal is fed to a dot counter 12 which generates dot timing clock pulses of 6.048 MHz and character timing clock pulses of 756 KHz by dividing the frequency of the oscillation signal. A display controller 13 generates horizontal and vertical synchronous signals, a display timing signal, refresh-memory address signal, and a raster address signal in response to a command from the microcomputer 4 and to the character timing clock pulses from the dot counter 12. A hold signal gnerating circuit 14 sends a hold signal to a hold terminal HOLD of the microcomputer 4 on the basis of the horizontal and vertical synchronous signals from the display controller 13, with which hold signal the microcomputer 4 is caused to operate in a in hold state for a displaying interval. A multiplexer 15 switches an address signal from the microcomputer 4, the refresh-memory address signal and the raster address signal from the display controller 13 in accordance with a hold acknowledge signal HOLDA from the microcomputer 4. Bus drivers 16, 17 and 18 change over the direction of data from the microcomputer 4 to display memories or vice versa, assuming tristate. A character memory 19 stores ASCII coded data to be displayed from the microcomputer 4, and outputs the contents of the refresh-memory address signal from the display controller 13 as an address. A character generator 20 outputs a display pattern in accordance with display address from the character mermory 19 and the raster address signal from the display controller 13. A first graphic memory 21 stores therein map data from the microcomputer 4. A second graphic memory 22 stores therein travelling route inforamtion, such as the travelling locus and the present location data, fed from the microcomputer 4. Parallel-to-serial converters 23, 24 and 25 convert parallel signals from the character generator 20 and the first and second graphic memories 21 and 22 into serial data with the dot timing clock pulses from the dot counter 12. The parallel-to-serial coversion is referred to as P-S coversion. A video controller 26 generates a video signal with the display timing signal from the display controller 13 by switching the reception of the signals from the P-S converter 23 and P-S converters 24 and 25 so as to select one of graphic and character pictures by a change-picture signal from the microcomputer 4. The change-picture signal will be one of a change-to-character signal and a change-to-picture signal as will be described later. An EX-OR gate generates a synchronous signal from the horizontal and vertical synchronous signals from the display controller 13. The above-mentioned character memory 19 and the first and second graphic memories 21 and 22 are always supplied with electrical power from the vehicle-mounted battery.

Summarizing the operation of the CRT controller 5, character data, travelling locus data and present location data and map data from the microcomputer 4 are respectively stored in the character memory 19, the first graphic memory 21, and the second graphic memory 22 for all the time, while one of the graphic picture and character picture is selected to generate a corresponding video signal so that a desired picture, which has been selected, can be displayed on the screen of CRT unit 6. In the above, with the words, graphic picture is meant a picture of a map on which travelling locus and present location are indicated (see FIG. 1), and with the words, character picture is meant a picture showing map-designation characters with which designation of a geographical region will be effected (see FIG. 7).

FIGS. 3A, 3B and 3C illustrate various views of the cassettte tape 3a arranged to be reproduced by the reading unit 3 of FIG. 1. Namely, the cassette tape 3a carries map data which will be displayed by the display unit 6. The cassette housing of the cassette tape 3a has the same size and configuration as widely used compact cassettes for recording and reproducing audio signals, such as music. However, the cassette housing differs from well-known compact cassettes in that a small window WD is provided on the rear side thereof as shown in FIG. 3B. The reference numerals T1 and T2 indicate breakable protect tabs used for preventing the recorded information from being erroneously erased. The window WD has the same size as the tabs T1 and T2, and is provided at a midway point between these two tabs T1 and T2. This window WD will be detected, as will be described hereafter, to determine that a loaded cassette carries map information rather than audio signals.

Figure 4:
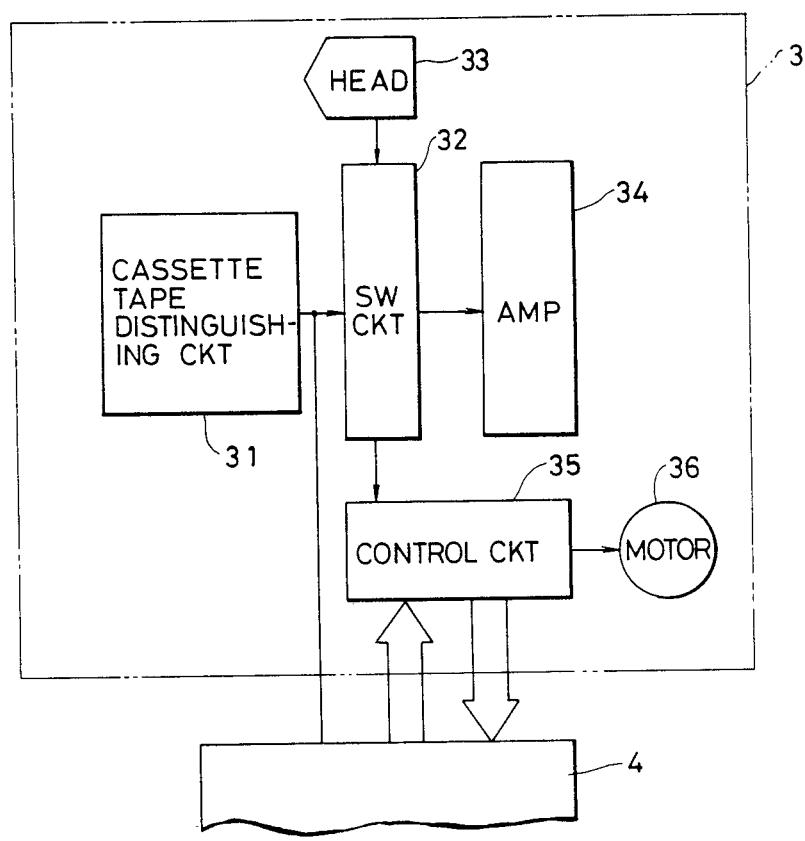
FIG. 4 is a block diagram of the reading unit shown in FIG. 1.

FIG. 4 is a block diagram of the reading unit 3 having a cassette tape distinguishing circuit 31 functioning as a cassette-sort detector, a switching circuit 32, a reproduce head 33, an ampifier 34, a control circuit 35, and a driving motor 36. Namely, the reading unit 3 is substantially the same as well-known cassette player except for the casssette tape distinguishing circuit 31, the switching ciruit 32 and the control circuit 35.

The cassette tape distinguishing circuit 31 comprises a detector which detects the presence of the window WD of the cassette housing of FIG. 3B. The detector may be a mechanical switch having a movable pin which can be inserted into the window WD. Alternatively, an optical detector for the detection of the window WD may be used. The cassette tape distinguishing circuit 31 thus produces an output signal, which will be referred to as a map tape signal, in the presence of the window WD on the rear side of the cassette housing. The switching circuit 32 is controlled by the map tape signal from the cassette tape distinguishing circuit 31 so that reproduced data fed from the reproduce head 33 is transmitted to either the amplifier 34 or the control circuit 35. In detail, when map data is picked up by the reproduce head 33, the reproduced data is fed to the control circuit 35, and on the other hand, audio signals from a different cassette tape are transmitted to the amplifier 34 to drive one or more speakers (not shown) of a sound reproduction system.

The control circuit 35 comprises an amplifier, an A/D converter, an interface circuit connected to the microcomputer 4, and a drive circuit for driving the motor 36. In detail, the amplifier of the control circuit 35 amplifies the signal picked up by the reproduce head 33, and this signal is A/D converted to be fed via the interface circuit to the microcomputer 4. On the other hand, when a drive signal including a command of one of fast forward, rewind, reproduce, cancel of these commands, and stop is fed from the microcomputer 4 to the interface circuit, the drive circuit produces a corresponding driving output to control the drive motor 36 so that the reeling and driving operation of the cassette tape 3a can be controlled.

Figure 5:
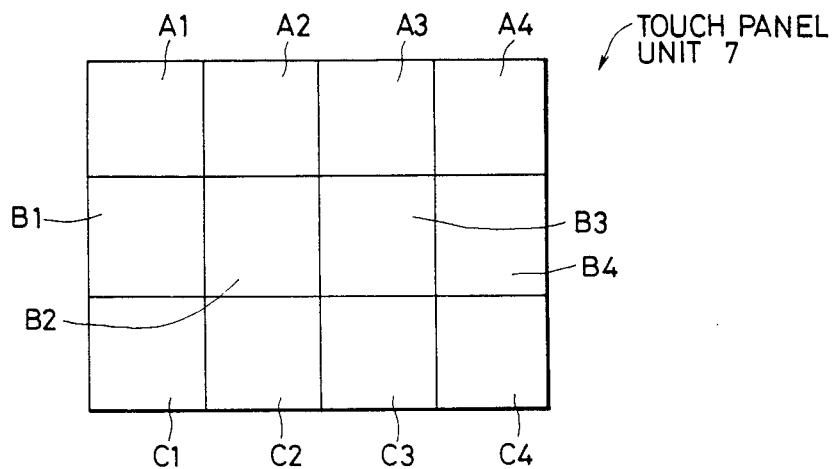
FIG. 5 is an explanatory diagram showing touch-areas of the touch-panel shown in FIG. 1.

FIG. 5 shows the touch-panel unit 7 of FIG. 1. The touch-panel unit 7 comprises a pair of glass plates stacked with a predetermined space therebetween and a pair of transparent conductive films formed on the surface of the glass plates respectively so that the pair of conductive films face each other without coming into contact in the absence of an external force. Each of the conductive films is divided into twelve sections in the form of a matrix A1 to A4, B1 to B4, and C1 to C4 as shown in FIG. 5. The divided sections provide the aforementioned twelve touch-areas on the surface of one of the glass plates. The touch-panel unit 7 is disposed on the surface of the CRT screen of the CRT unit 6, so that the touch areas A1 to A4, B1 to B4 and C1 to C4 on the surface of one of the glass plates can be depressed by a finger of the user. Assuming a given touch area is depressed, the depressed glass plate, which is exposed outside, sags under the depressing force to cause the facing conductive films to contact each other at the depressed point. An unshown touch signal generating circuit is responsive to this electrical connection so that a serial signal indicative of the depressed or touched area is generated. Each of the serial signal includes a start signal and touch-area information, where the touch signal generating circuit is arranged to produce an output signal at an interval of 40 milliseconds.

Figure 6:
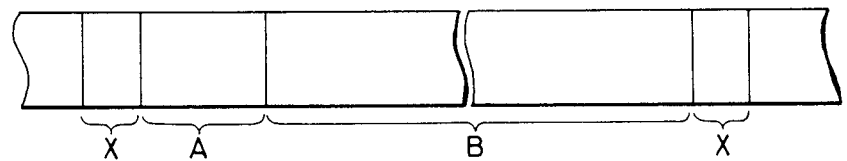
FIG. 6 is a front view of a portion of the tape of the cassette tape of FIGS. 3A, 3B and 3C, which front view shows a data region.

FIG. 6 shows an enlarged view of a portion of the tape of the cassette tape 3a for the explanation of the way of data storage, showing a region carrying map information of a single section. The reference A indicates a header portion in which data of the absolute co-ordinates of the right top point of a map of a given region is stored. The absolute co-ordinates mean the co-ordintates with respect to the North Pole. The reference B indicates a map data portion in which the map data of the region is stored. Blank portions are indicated at the reference X. The recorded data in the portions A and B are read out by the reading unit 3 so that map data and absolute co-ordinates data of a specific region are derived and applied to the microcomputer 4.

Figure 8:
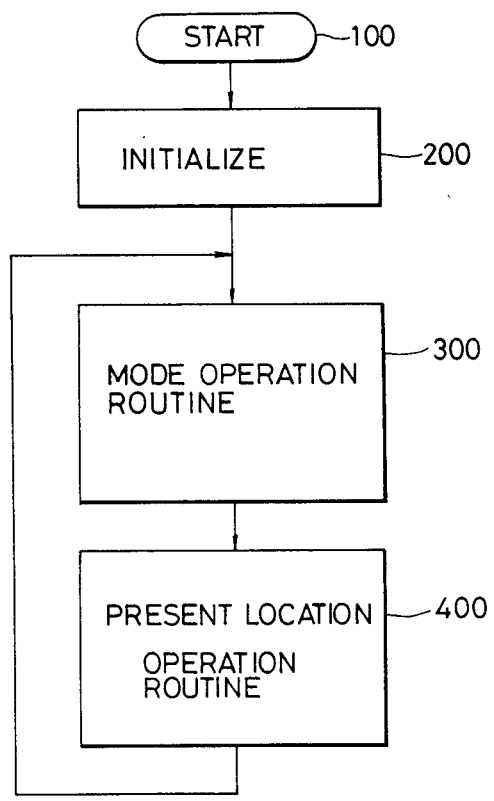
FIG. 8 is a flowchart showing the main routine for the operation of the microcomputer shown in FIG. 1.
Figure 9:
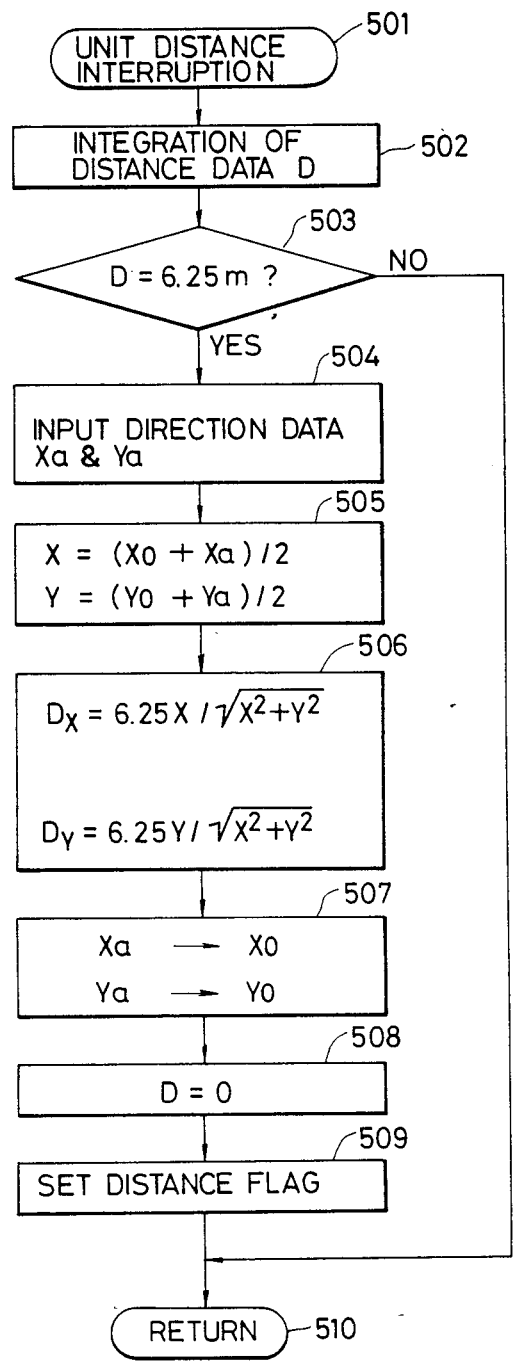
FIG. 9 is a flowchart showing an interrupt service routine for the operation of the microcomputer shown in FIG. 1.
Figure 10:
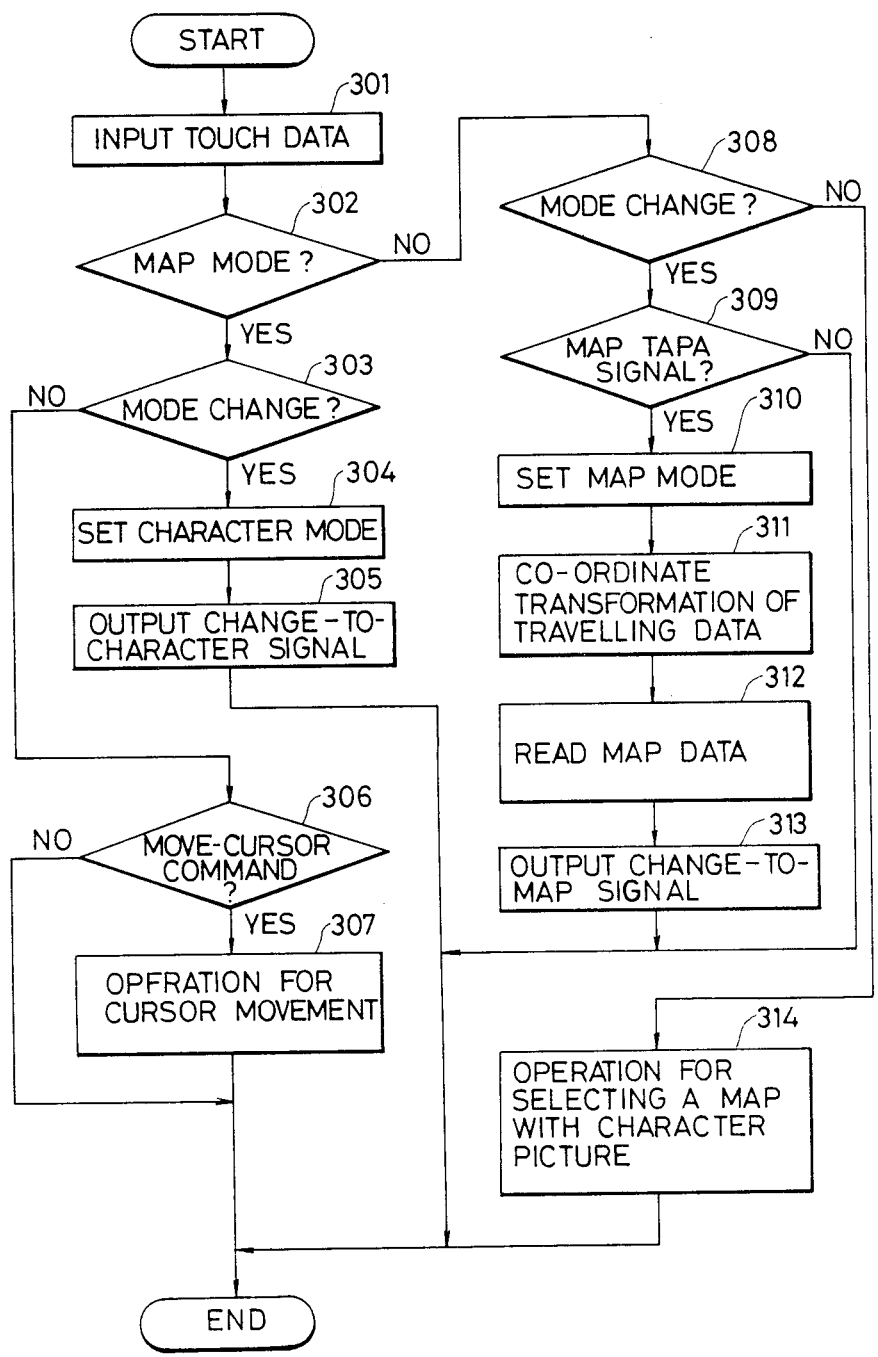
FIG. 10 is a flowchart showing steps included in the mode-operation routine of the main routine of FIG. 8.
Figure 11:
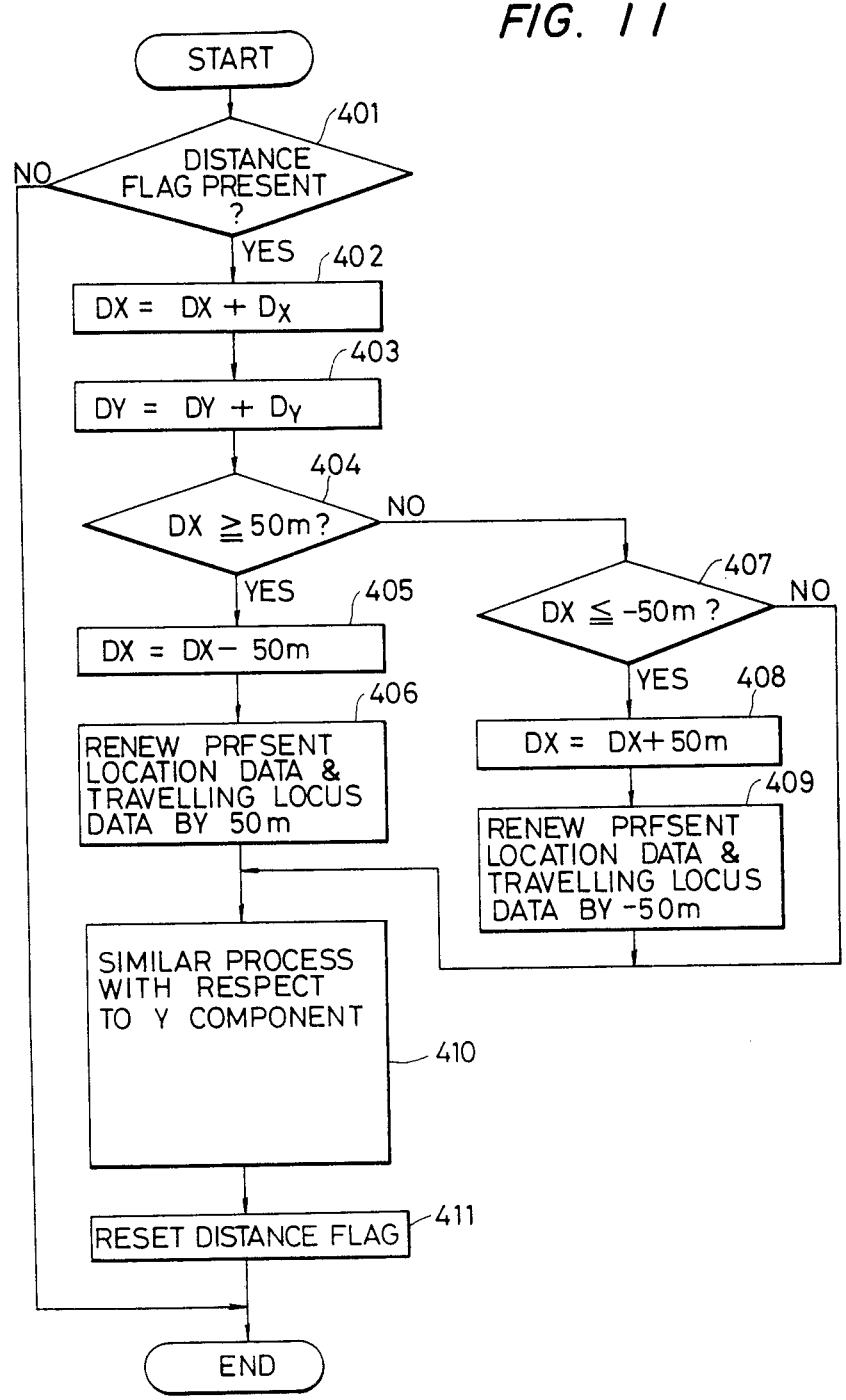
FIG. 11 is a flowchart showing steps included in the present location operation routine of the main routine of FIG. 8.

Hereafter will be described the operation of the navigation system with reference to a displayed picture of FIG. 7 and various flowcharts of FIGS. 8 to 11. FIG. 8 is a flowchart showing the main routine for the operation of the microcomputer 4; FIG. 9 is a flowchart showing an interrupt service routine for the operation of the microcomputer 4; FIG. 10 is a flowchart showing steps included in the mode-operation routine of the main routine of FIG. 8; and FIG. 11 is a flowchart showing steps included in the present location operation routine of the main routine of FIG. 8.

Let us assume that the key switch of the motor vehicle equipped with the navigation system of FIG. 1 is turned on. Then electrical power is fed from the vehicle-mounted battery to the navigation sytem to put the same in operating condition. The microcomputer 4 receives regulated 5 V voltage from the power regulator to start its operation. Namely, the microcomputer 4 starts operating from a start step 100 of the main routine of FIG. 8. In a following initializing step 200, necessary initialization of unshown registers, counters and latches of the microcomputer 4 is effected to start its operation. After the initializing step 200, a mode operation routine 300 and a present location operation routine 400 are repeatedly executed at an interval of several tens of milliseconds.

In the mode operation routine 300, one of a map mode and a character mode is selected to display one of the aforementioned graphic picture and character picture on the CRT screen. In the case of the map mode, an operation is executed so that a cursor indicative of the present location of the motor vehicle is made movable. On the other hand, in the case of the charcter mode, an operation is executed in which a specific area, region and section can be designated. Subsequent to one of these operations, the following present location operation routine 400 takes place.

In the present location operation routine 400, present location data and travelling locus data both stored in the second graphic memory 22 of the CRT controller 5 are renewed each time the motor vehicle traveles ±50 meters measured along the X and Y axes. After this operation the operational flow returns to the mode operation routine 300, and these two routines 300 and 400 are repeatedly executed one after another.

During execution of the main routine of FIG. 8 when the output pulse from the distance sensor 2 of FIG. 2 is applied to an interrupt terminal INT of the microcomputer 4, the execution of the main routine is interrupted to start executing an interrupt service routine shown in FIG. 9. Namely, the operation of the interrupt service routine is started from a start step 501, and in a following step 502 of distance integration, distance data D prestored in the RAM 4c is added with unit distance data, which corresponds to approximately 39.2 centimeters, to be renewed. In a following step 503 of distance decision, it is detected whether the distance data D has reached a value of 6.25 meters or not. If the distance data D is smaller than 6.25 meters, the answer of the step 503 becomes NO so that the operational flow goes to a return step 510. On the other hand, if the distance data D is equal to or greater than 6.25 meters, the answer of the step 503 becomes YES to execute a following step 504. The step 504 is for inputting the direction signal from the direction detector 1. Namely, the travelling direction of the motor vehicle is expressed by X and Y component digital signals Xa and Ya which assume a positive value for the East and North and a negative values for the West and South. In a following step 505 of calculating an average direction, average direction data X and Y are respectively obtained from the direction data Xa and Ya and their former data Xo and Yo obtained before the motor vehicle has travelled 6.25 meters. Then in a following step 506 of distance calculation, distance components $D_x$ and $D_y$ in the directions of X axis and Y axes are obtained by using the following equations:

$$D_x = 6.25X/\sqrt{X^2 + Y^2} \; ; \; D_y = 6.25Y/\sqrt{X^2 + Y^2}$$

In the above equations, $X/\sqrt{X^2+Y^2}$ corresponds to $\cos \theta$, and $Y/\sqrt{X^2+Y^2}$ corresponds to $\sin \theta$ when $\theta$ is a counterclockwise angle measured from a reference direction oriented to the East.

In a following step 507 of storing, the updated date Xa and Ya are stored as data Xo and Yo for a next average data calculation. In a step 508 of resetting distance data, the distance data D is reset to zero and then in a following step 509 of flag setting, a distance flag is set. After the completion of the step 509, the operational flow goes to the return step 510 so that execution of the intrrupted main routine will be effected from the point where interruption has occurred.

Summarizing the operation in the interrupt service routine of FIG. 9, the distance data D is integrated to renew the same each time the motor vehicle travels the unit distance, and when the distance data D reaches 6.25 meters, distance components $D_x$ and $D_y$ in the directions of the X and Y axes are calculated, and then the distance flag is set.

Referring to FIG. 10, the mode operation routine 300 of FIG. 8 will be described in detail. In a first step 301 of the mode operation routine 300, touch-data from the touch-panel unit 7 is stored into the RAM 4c. In a following step 302 of map mode detecting, it is detected whether the contents of a mode area in the RAM 4c are of the map mode or not. If the contents are of the map mode, the answer of the step 302 becomes YES to execute a following step 303 of mode change detection to detect whether the touch-data stored in the RAM 4c indicates mode change. This touch-data indicative of mode change is a data previously generated by the touch-panel unit 7 when the right top area A4 of FIG. 5 was depressed. If the prestored touch-data indcates mode change, the answer of the step 303 becomes YES to execute a step 304 in which the contents of the mode area in the RAM 4c are set to the character mode. Then in a following step 305 a change-to-character signal is sent to the video controller 26 of the CRT controller 5 so that a character picture is displayed on the CRT screen. With the completion of the execution of the step 305, one cycle of the operation of the mode operation routine 300 terminates.

On the other hand, if the above-mentioned prestored touch-data does not indicate mode change, namely, when touch-areas other than the right top area A4 of the touch-panel 7 has been depressed, or if none of the touch-areas has been depressed (for instance, in the case of data representing FF of sexadecimal notation), the answer of the mode change detecting step 303 becomes NO. In this case, a step 306 takes place in which it is detected whether the touch-data is one of data obtained when one of the touch-areas A2, A3, B1, B4, C2 and C3 has been depressed or not. The touch-data obtained when one of the touch-areas A2, A3, B1, B4, C2 and C3 has been depressed represents a move-cursor command. If the prestored touch-data is other than move-cursor data, the answer of the step 306 becomes NO to end one cycle of the mode operation routine 300. On the other hand, if the prestored data is move-cursor data, the answer of the same becomes YES to execute a following step 307 for move-cursor operation.

The move-cursor data or command produced when one of the touch-areas A2, A3, B1, B4, C2 and C3 has been depressed is arranged such that touch-data obtained when the touch-area A2 or A3 is depressed represents a command for moving the cursor on the CRT screen to the North by a predetemrined distance; touch-data obtained when the touch-area B1 is depressed represents a command for moving the cursor to the West by the predetemrined distance; touch-data obtained when the touch-area B4 is depressed represents a command for moving the cursor to the East by the predetemrined distance; touch-data obtained when the touch-area C2 or C3 is depressed represents a command for moving the cursor to the South by the predetemrined distance. In response to such a move-cursor command among the touch-data the contents of the second graphic memory 22 of the CRT controller 5 are changed so that necessary movement of the cursor in one of the four directions is performed. After completion of move-cursor operation 307, one cycle of the mode operation routine 300 terminates.

Turning back to the above-mentioned map mode detecting step 302 of FIG. 10, if the answer of this step 302 is NO, a step 308 takes place to detect whether the prestored touch-data indicates a mode change command in the same manner as the step 303. If the prestored touch-data indicates a mode change command, the answer of the step 308 becomes YES to execute a following step 309 in which it is detected whether the map tape signal from the cassette tape distinguishing circuit 31 of FIG. 4 is present or not. The map tape signal is a signal indicating that the loaded casstte carries road map information as described with reference to FIG. 4. In the presence of the map tape signal, the answer of the step 309 becomes YES to execute a following step 310 in which the map mode is set. Namely, the contents of the mode area in the RAM 4c are set to the map mode. Then a step 311 takes place to transform the travelling route data in the second graphic memory 22 of the CRT controller. To this end the reading unit 3 is controlled to search a designated section using a reference number of a corresponding map. Then co-ordinate transformation amouts are calculated on the basis of the absolute co-ordinate data from the hedder portion A of FIG. 6, corresponding to the found map data and another absolute co-ordinate date of the map of the former section. Using the calculated amounts, the data of the travelling locus and the present location in the second graphic memory 22 are tranformed so that they are shifted.

In a step 312, the map data is read out from the cassette tape 3a by the reading unit 3, and this read out data is transmitted to the first graphic memory 21. In a following step 313, the microcomuter 4 produces a change-to-map signal to send it to the video controller 26 of FIG. 2 so that a graphic picture of the designated map will be imaged on the CRT screen. After the completion of the step 313, one cycle of the mode operation routine 300 terminates. Namely, in order to change from a character picture to a graphic picture of a map which is different from the former one, the above-described operations are executed so that map data to be displayed is stored in the first graphic memory 21, while the contents of the second graphic memory 22 are changed to cause the travelling locus and the cursor to indicate the present location. With this operation, therefore, it is possible to correctly indicate the travelling locus and the present location of the motor vehicle on the displayed map irrespective of the change of maps.

Turning back to the step 308 of mode change detection, if the answer of the step 308 is NO, a step 314 of character operation is executed. This step 314 of character operation is executed only when the character mode has been set while the change-to-character signal is fed to the video controller 26. Under this condition, the CRT display unit 6 displays a character picture as shown in FIG. 7. Three sets of numerals 02-4-68 at the center of the screen respectively indicate an area, a region and a section. Each of the numerals can be either increased or decreased by 1 when an increment switch 51 or a decrement switch 52 is depressed. A set switch 53 and a reset switch 54 are provided to respectively set renewed sets of numerals and to reset them to zero. Namely, a map of a desired section will be selected by determining first the area and the region including the section, and by finally determining the section by setting the three sets of numerals. In other words, a map number designating a map of a predetermined section will be determined by these three sets of numerals indicating area, region and section. A plurality of map numbers are stored in the RAM 4c and one of them will be designated to reproduce corresponding data from the cassette tape 3c. The switches 51 through 54 are actualized by the touch-areas C1, C2, C3 and C4 of the touch-panel unit 7.

Summarizing the operation in the mode operation routine 300 of FIG. 10, the following operations (1) through (4) will be executed in accordance with touch-data from the touch-panel unit 7 and the contents of the mode area in the RAM 4c:

(1) In the case of the map mode and when mode change is not requested, in the presence of a move-cursor command, an operation on cursor movement is executed, and on the other hand in the absence of a move-cursor command, map display is continued.

(2) In the case of the map mode and when mode change is requested, the map mode is changed to the character mode, while the character picture is displayed on the screen of the CRT display unit 6.

Figure 7:
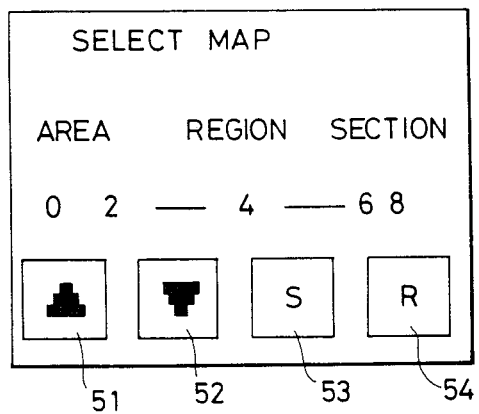
FIG. 7 is an example of a picture displayed on the CRT screen shown in FIG. 1.

(3) In the case of the character mode and when mode change is not requested, request for map change will be accepted with the character picture of FIG. 7 displayed.

(4) In the case of the character mode and when mode change is requested, in the presence of the map tape signal from the cassette tape distinguishing circuit 31, the character mode is changed to the map mode to display a graphic picture of a map on the screen of the CRT dispay unit 6. Simultaneously, the travelling locus and the present location on the screen are corrected.

Turning back to FIG. 8 showing the main routine, the detailed operation in the present location operation routine 400 will be described with reference to FIG. 11. In a first step 401 of the present location operation routine 400, it is detected whether the distance flag has been set in the interrupt service routine of FIG. 9. If no distance flag has been set, the answer of the step 401 becomes NO to terminate one cycle of the operation of the present location operation routine 400. On the other hand, if the distance flag has been set, the answer of the step 401 becomes YES to execute a step 402 in which X distance data DX will be corrected. The X distance data DX is corrected by an X distance component $D_x$, which has been obtained in the interrupt service routine, to calculate $DX=DX+D_x$. Then a step 403 takes place to correct Y distance data DY as $DY=DY+D_y$ in the same manner as the X distance data DX. In a following step 404, it is detected whether the X distance data DX assumes a value equal to or greater than 50 meters. If the answer of the step 404 is YES, a step 405 of reducing the X distance will be executed to calculate as $DX=DX-50$ m, and then a step 406 of move-indication takes place in which the present location data in the second graphic memory 22 is corrected so that stored present location is moved to a positive direction corresponding to the East by 50 meters. Simultaneously, the travelling locus data is changed to follow the present location data.

On the other hand, if the answer of the step 404 is NO, another step of the X distance detecting is executed to see if the X distance data DX is smaller than $-50$ meters. If it is detected that the X distance data DX indicates a value which is smaller than $-50$ meters, the answer of the setp 407 becomes YES to execute a step 408 in which calculation of $DX=DX+50$ m is effected. Then a step 409 of move-indication is executed to change the present location data in the second graphic memory 22 so that the stored present location is moved to a negative direction, i.e. to the West, by 50 meters. The travelling locus data will also be corrected accordingly.

After the completion of the step 406 or 409, or in the case that the answer of the step 407 is NO, a step 410 takes place to process the Y distance data DY which has been obtained in the step 403. Namely, the step 410 executes operations similar to the above-described steps 404 through 409 in connection with Y component so that the present location data and the travelling locus data in the second graphic memory 22 are changed. Thus, the stored present location is moved by 50 meters and the travelling locus follows the present location when the absolute value of the Y distance data equals or exceeds 50 meters. Subsequent to the step 410, the distance flag is reset in a step 411 to terminate one cycle of the operation of the present location operation routine 400.

From the above it will be understood that as the motor vehicle travels the present location data and the travelling locus data stored in the second graphic memory 22 are renewed in the present location operation routine 400 of FIG. 11 irrespective of the sort of the picture displayed on the CRT screen. Since the main routine of FIG. 8 as well as the interrupt service routine of FIG. 9 is repeatedly executed, the present location data and the travelling locus data in the second graphic memory 22 are updated one after another so that the present location and the travelling locus are superposed on the graphic picture of a displayed map when in map mode.

With the navigation system according to the present invention, the user who may be the motor vehicle driver or an occupant, will be informed with the present location and the travelling locus both shown on the map displayed on the CRT screen. When the motor vehicle travels to a point outside the displayed map, the map may be changed to adjacent one by manipulating the touch-area A4 which generates the aforementioned mode change command. Thus, the character picture of FIG. 7 will be displayed with which another desired map will be selected. When a new map is displayed, the present location and the travelling locus will be automatically shown on correct places on the new map so that the vehicle driver would not be disturbed with troublesome manipulation which have been inevitable in the conventional navigation systems.

As described before, since the reading unit 3 comprises the cassette tape distinguishig circuit 31 as shown in FIG. 4, in receipt of a normal cassette carrying information other than map data the navigation system will be disabled and the stereophonic sound reproduction system will be activated to reproduce audio signals such as music. Namely, normal cassettes carrying such audio signals do not have the window WD of FIG. 3B and therefore, the above-mentioned map tape signal is not fed to the switching circuit 32. Therefore, the reproduced signals from the reproduce head 33 are fed to the ampifier 34 only so that the reproduced music or the like is emitted in the vehicle compartment through one or more speakers.

The above-described embodiments are just examples of the present invention, and therefore, it will be apparent for those skilled in the art that many modifications and variations may be made without departing from the spirit of the present invention.

For instance, although the CRT display unit 6 has been shown as a displaying device, other displaying devices such as liquid crystal display device or EL display device may be employed therefor. Furthermore, the location of the small window WD made in the rear side of the cassette is not limited to the midway point between the two tabs T1 and T2. For instance, a single window may be provided next to one of the tabs T1 and T2, or a pair or windows may be provided so that each window is adjacent to each of the tabs T1 and T2. Moreover, such one or more windows may be provided to the front side of the cassette unless tape travelling operation is not affected. In order to distinguish the particular cassette tape carrying road map information from normal cassettes carrying audio signals, other measure may be employed. For instance, a metallic film piece may be attached to a given place of the cassette carrying road map information so that the cassette may be readily distinguished from normal cassettes by detecting the presence of the metallic portion.

In the above-described preferred embodiment although data for determining the present location of the motor vehicle are obtained by the direction detector 1 and the distance sensor 2 which are both mounted on the vehicle, it is possible to receive data indicative of the present location from road side equipment. Namely, transmitters which transmit codes indicative of the position thereof may be provided at various places, for instance at major intersections, so that a receiver associated with the navigation system receives the transmitted data to indicate the present location.

What is claimed is:

1. A navigation system for use with an automobile, comprising:
   (a) reading means for deriving either road map data or audio information from a detachable recording medium;
   (b) circuitry for producing a signal indicative of the present location of said automobile;
   (c) display means, responsive to said reading means and to said present location circuitry, for displaying a road map derived from said road map data and the present location when road map data is supplied thereto;
   (d) audio information reproducing means, responsive to said reading means, for providing audio signals when audio information is applied thereto;
   (e) first means for detecting whether the contents of said recording medium is road map data or audio information so as to distinguish recording medium carrying said road map data from other recording medium carrying audio information; and
   (f) second means, responsive to said first means, for supplying said display means with road map data read from said recording medium only when said recording medium has been determined by said first means, as carrying said road map data and for supplying said audio information reproducing means with audio information read out from said recording medium only when said recording medium has been determined as carrying said audio information by said first means.

2. A navigation system as claimed in claim 1, wherein said reading means is a cassette tape player.

3. A navigation system as claimed in claim 2, wherein said first means comprises a window detector which produces an output signal when detecting a window at a predetermined position of the cassette loaded in said cassette player.

4. A reading unit for use with a vehicle-mounted navigation system and an audio information reproducing circuit, for deriving either road map data or audio information from a detachable recording medium, which navigation system includes a display means for displaying a road map derived from said recording medium, said reading unit comprising:
   first means for driving said recording medium;
   second means for reading information from said recording medium;
   third means for detecting whether the contents of said recording medium is road map data or audio information so as to distinguish recording medium carrying said road map data from other recording medium carrying audio information; and
   fourth means responsive to said third means for supplying said display means with road map data read from said recording medium only when said recording medium has been determined as carrying said road map data by said third means, and for supplying said audio information reproducing circuit with audio information read from said recording medium only when said recording medium has been determined as carrying said audio information by said third means.

5. A reading unit as claimed in claim 4, wherein said first and second means constitute a cassette player for reproducing data from a cassette tape.

6. A reading unit as claimed in claim 5, wherein said third means comprises a window detector which produces an output signal when detecting a window at a predetermined position of the cassette loaded in said cassette player.

7. A reading unit as claimed in claim 4, further comprising an amplifier for amplifying audio signals, said amplifier being arranged to receive, from said fourth means, audio signals picked up by said first means when a casstte tape carrying other than road map data is loaded into said cassette player.

8. A navigation system for use with an automobile, comprising:
  (a) a direction detector for producing an output signal indicative of the travelling direction of said automobile;
  (b) a distance sensor for producing a signal each time said automobile travels a predetermined unit distance;
  (c) a reading unit for deriving either road map information or audio information from a detachable recording medium, said reading unit including first means for driving said recording medium, a second means for detecting whether the contents of said recording medium is road map data or audio information so as to distinguish recording medium carrying said road map data from other recording medium carrying audio information; and fifth third means for outputting, via a first output terminal, road map data read out from said recording medium only when said recording medium has been determined by said second means as carrying said road map data, and for outputting, via a second output terminal, audio information read out from said recording medium only when said recording medium has been determined by said second means as carrying said audio information;
  (d) a microcomputer, responsive to the road map information from said first output terminal of said third means for producing first output data, and to the output signals from said direction detector and said distance sensor for producing second output data;
  (e) a display controller, responsive to said first and second output data, for producing a video signal; and
  (f) a display unit responsive to said video signal for displaying said road map data as well as the present location of the automobile.

9. A navigation system as claimed in claim 8, further comprising a touch-panel unit attached to the display surface of said display unit, said touch-panel unit having a plurality of transparent switches for accepting various commands of the user, which commands are fed to said microcomputer to control said reading unit as well as said display unit.

* * * * *